(12) United States Patent
Adams et al.

(10) Patent No.: US 7,151,478 B1
(45) Date of Patent: Dec. 19, 2006

(54) PSEUDO-ORTHOGONAL WAVEFORMS RADAR SYSTEM, QUADRATIC POLYPHASE WAVEFORMS RADAR, AND METHODS FOR LOCATING TARGETS

(75) Inventors: Vinh N. Adams, Tucson, AZ (US); Wesley H. Dwelly, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 181 days.

(21) Appl. No.: 11/052,975

(22) Filed: Feb. 7, 2005

(51) Int. Cl.
*G01S 13/00* (2006.01)
*G01S 13/88* (2006.01)
*H04B 1/69* (2006.01)

(52) U.S. Cl. .................. 342/62; 342/27; 342/28; 342/61; 342/63; 342/67; 342/118; 342/145; 342/146; 342/147; 342/175; 342/189; 342/195; 342/196; 244/3.1; 375/130; 89/1.11; 370/203; 370/208; 370/210

(58) Field of Classification Search ........ 375/130–153; 370/203–211; 342/27, 28, 59, 82, 89, 90, 342/118, 145, 175, 189–197, 61–67, 70, 128–147, 342/450–465, 200–205; 89/1.11; 708/250–256
See application file for complete search history.

(56) References Cited

U.S. PATENT DOCUMENTS

| | | | | |
|---|---|---|---|---|
| 3,510,595 | A * | 5/1970 | Gutleber .................... 370/203 |
| 4,357,610 | A * | 11/1982 | Kingston et al. ........... 342/145 |
| 4,443,799 | A * | 4/1984 | Rubin ....................... 342/201 |
| 4,489,392 | A * | 12/1984 | Lewis ........................ 342/194 |
| 4,513,288 | A * | 4/1985 | Weathers et al. ........... 342/201 |
| 4,679,048 | A * | 7/1987 | Brandsetter et al. .......... 342/61 |
| 4,758,839 | A * | 7/1988 | Goebel et al. .............. 342/132 |
| 4,876,549 | A * | 10/1989 | Masheff ..................... 342/195 |
| 5,075,863 | A * | 12/1991 | Nagamune et al. ......... 342/130 |
| 5,136,611 | A * | 8/1992 | Kirimoto et al. ........... 375/130 |
| 5,291,202 | A * | 3/1994 | McClintock ................ 342/132 |
| 5,703,321 | A * | 12/1997 | Feierlein et al. ............. 89/1.11 |
| 5,724,041 | A * | 3/1998 | Inoue et al. .................. 342/70 |

(Continued)

FOREIGN PATENT DOCUMENTS

EP      0362992 A2 *  4/1990

OTHER PUBLICATIONS

H. Jafarkhani et al., "Pseudo Orthogonal Designs as Space-Time Block Codes"; No publisher given; no publication place given; no date given.*

*Primary Examiner*—Bernarr E. Gregory
(74) *Attorney, Agent, or Firm*—Thomas J. Finn; Leonard A. Alkov; Karl A. Vick

(57) ABSTRACT

In some pseudo-orthogonal waveform embodiments, a radar system transmits pseudo-orthogonal waveforms and performs multiple correlations on a combined single receiver channel signal. In some quadratic polyphase waveform embodiments, a radar system may simultaneously transmit frequency separated versions of a single quadratic polyphase waveform on a plurality of transmit antennas, combine the return signal from each antenna into a combined time-domain signal, and perform a Fourier transformation on the combined time-domain signal to locate a target. The radar system may identify a target, such as sniper's bullet, incoming projectile, rocket-propelled grenade (RPG) or a mortar shell. In some embodiments, the system may estimate the target's trajectory to intercept the target. In some embodiments, the system may estimate the target's trajectory and may further extrapolate the target's trajectory to locate the target's source, such as the sniper.

58 Claims, 11 Drawing Sheets

U.S. PATENT DOCUMENTS 6,031,485 A * 2/2000 Cellai et al. ................ 342/131

6,125,378 A * 9/2000 Barbano .................... 708/254

* cited by examiner

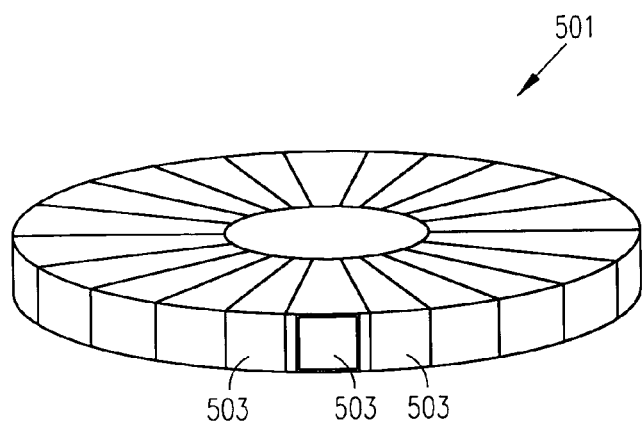
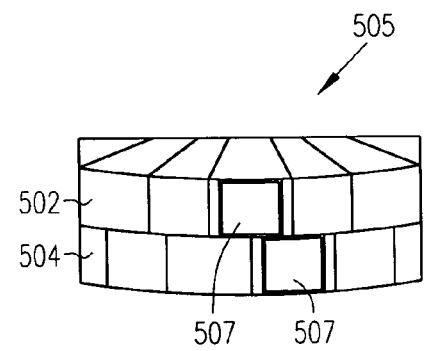
FIG. 5A  FIG. 5B
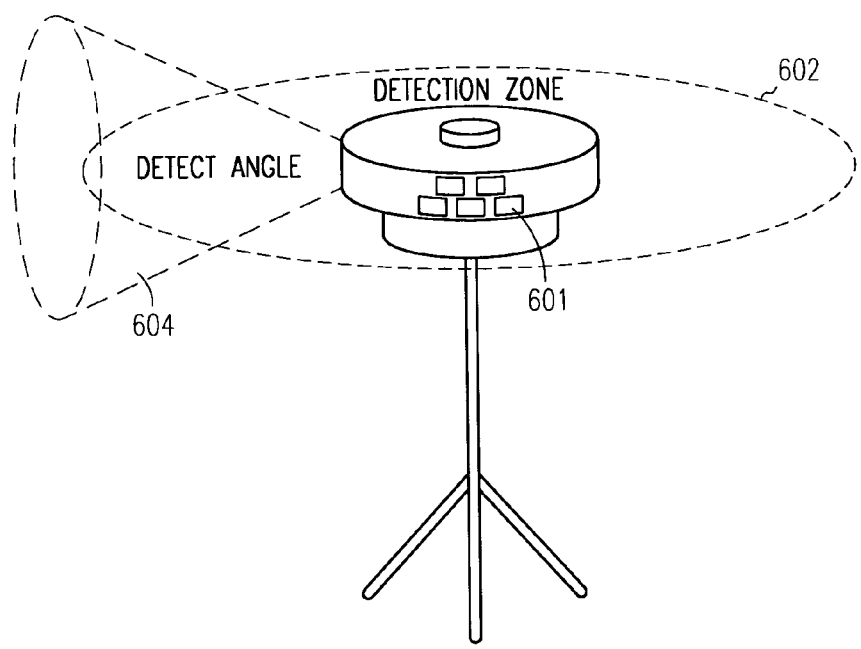
FIG. 6

| PARAMETER | EQUATION |
|---|---|
| CODE EQUATION | $\theta(n) = \dfrac{\pi n^2}{\#states}$ |
| BIT WIDTH | $T_b$ |
| BIT RATE/ BW FOR FULL UNAMBIGUOUS RANGE PROCESSING | $\dfrac{1}{T_b}$ |
| CODE LENGTH | $\#states$ |
| CODE REPETITION RATE/ RANGE BIN FREQUENCY SPACING | $\dfrac{1}{\#states \cdot T_b}$ |
| CODED SIGNAL BANDWIDTH | $\dfrac{2}{T_b}$ |
| RANGE RESOLUTION | $\dfrac{cT_b}{2}$ |
| UNAMBIGUOUS RANGE | $\dfrac{cT_b}{2} \#states$ |

FIG. 11

PSEUDO-ORTHOGONAL WAVEFORMS RADAR SYSTEM, QUADRATIC POLYPHASE WAVEFORMS RADAR, AND METHODS FOR LOCATING TARGETS

TECHNICAL FIELD

Embodiments of the present invention pertain to radar systems. In some embodiments, the present invention relates to locating snipers. In some embodiments, the present invention relates to intercepting incoming projectiles.

BACKGROUND

Snipers are a problem in urban warfare situations as well as on city streets. Snipers are difficult to locate and it's difficult to protect VIPs, police and soldiers from sniper fire. Some conventional systems use audio sensing techniques to help locate the sniper after a bullet is fired, but these techniques are not accurate and are difficult to implement. Furthermore, these techniques do not provide a way to stop the bullet. In some urban warfare situations, rocket-propelled grenades (PRGs), mortar, as well as other projectiles present similar problems.

Some conventional radar systems have been used to track and intercept incoming projectiles, but these systems are not easily deployed in urban situations, are large, cumbersome, and expensive. Additionally these systems do not offer protection against a close combat weapon (less than 100 meters) due to the scan time of conventional systems including mechanical scanning systems and electronically scanning array (ESA) systems.

Thus, there are general needs for improved radar systems. There area also general needs for systems and methods that can help protect against sniper fire as well as other projectiles, especially in urban situations.

SUMMARY

In some simultaneous pseudo-orthogonal waveform embodiments, a radar system transmits pseudo-orthogonal waveforms and performs multiple correlations on a combined single receiver channel signal to identify a target, such as sniper's bullet, incoming projectile, rocket-propelled grenade (RPG), or mortar. In some quadratic polyphase waveform embodiments, the radar system simultaneously transmits frequency separated versions of a single quadratic polyphase waveform on a plurality of transmit antennas, combines the return signal from each antenna into a combined time-domain signal, and perform a Fourier transformation on the combined time-domain signal to locate a target. In some embodiments, the system may estimate the target's trajectory to intercept the target. In some embodiments, the system may estimate the target's trajectory and may further extrapolate the target's trajectory to locate the target's source, such as a sniper or a RPG or mortar shooter. In some embodiments, the system may help protect against sniper fire as well as other projectiles, especially in urban situations. In some embodiments, the system is portable and may be vehicular mounted and may provide a longer standoff range. In some embodiments, the system may be used to counter sniper, RPG and/or mortar fire.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

FIGS. 5A and 5B illustrate antenna element configurations in accordance with some embodiments of the present invention;

FIG. 6 illustrates a detection zone and a detection angle of a radar system in accordance with some embodiments of the present invention;

FIG. 11 illustrates some example parameters for a quadratic polyphase waveform radar system in accordance with some embodiments of the present invention.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
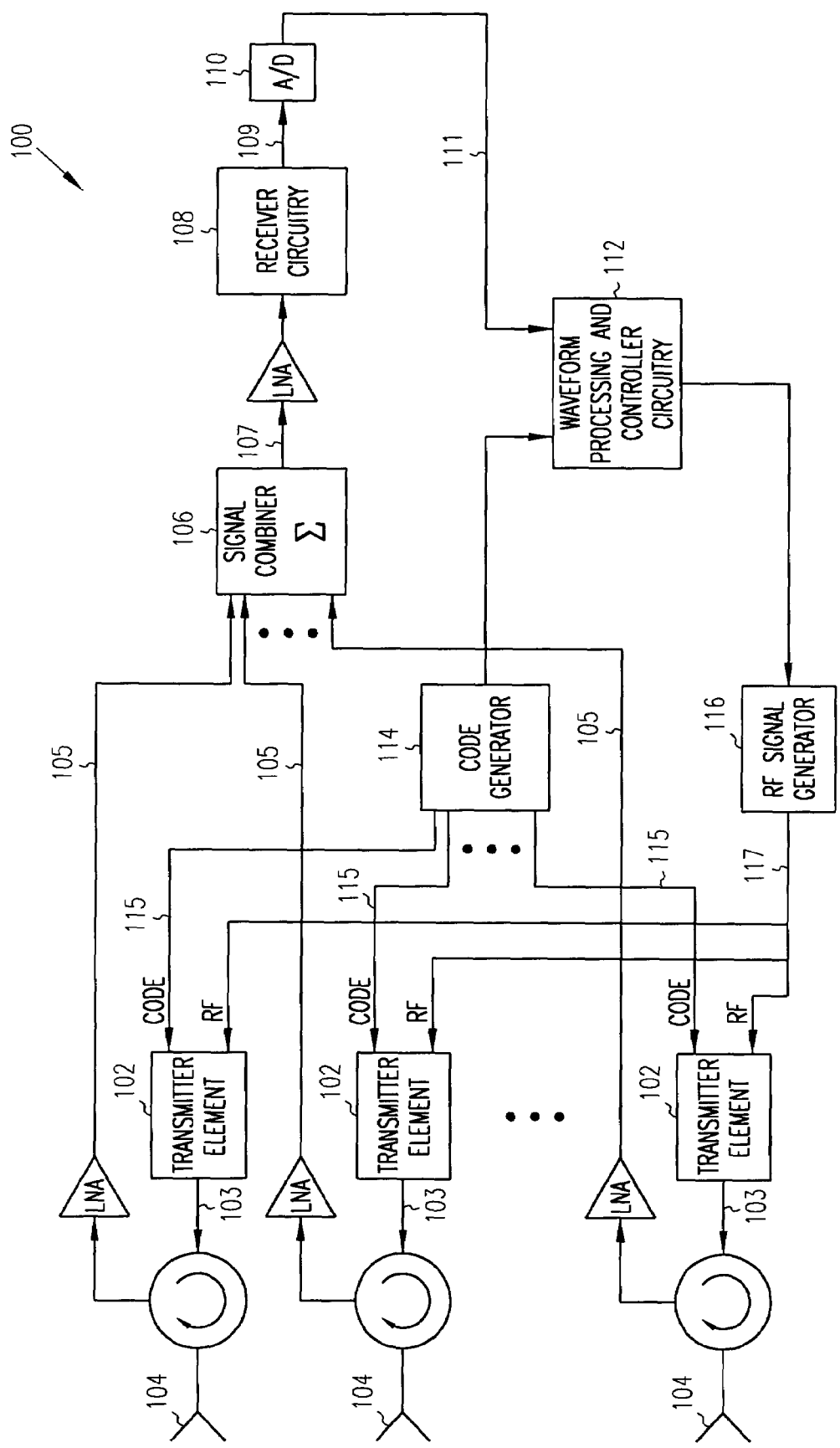
FIG. 1 is a functional block diagram of a radar system in accordance with some embodiments of the present invention.

FIG. 1 is a functional block diagram of a radar system in accordance with some embodiments of the present invention. In some embodiments, radar system 100 may be a pseudo-orthogonal waveforms radar system, while in other embodiments; radar system 100 may be a quadratic polyphase waveform radar system.

In some pseudo-orthogonal waveform embodiments, radar system 100 transmits pseudo-orthogonal waveforms 103 and performs multiple correlations on a combined single receiver channel signal 107 to identify a target, such as sniper's bullet, incoming projectile, rocket-propelled grenade (RPG) or mortar. In some embodiments, the target's trajectory may be estimated for launching an interceptor to intercept the target. In some embodiments, the target's trajectory may be extrapolated to determine the source location of target (e.g., the sniper's location).

In some pseudo-orthogonal waveform embodiments, radar system 100 comprises a plurality of transmitter elements 102, each to generate and transmit a pseudo-orthogonal waveform 103 on an associated one of a plurality of antenna elements 104. Radar system 100 also comprises circuitry 106 & 110 to combine and digitize return signals received by antenna elements 104 and generate single digital waveform 111. Radar system 100 also comprises waveform processing and controller circuitry 112 to perform correlations on single digital waveform 111.

In some embodiments, each of transmitter elements 102 may comprise a phase modulator to phase modulate radio-frequency (RF) signal 117 with one of a plurality of pseudo-orthogonal codes 115 to generate a unique one of pseudo-orthogonal waveforms 103 for transmission by the associated one of antenna elements 104. In some embodiments, the dot product of any two of pseudo-orthogonal codes 115 may be substantially zero. The term "pseudo-orthogonal" is used herein to describe codes or code sequences that are substantially orthogonal (i.e., not be perfectly mathematically orthogonal). In other words, the dot product between any two pseudo-orthogonal codes may not equal zero. In these embodiments, the dot product between any two pseudo-orthogonal codes may be close to zero or substantially zero. The term "pseudo-orthogonal" may also include codes or code sequences that are mathematically orthogonal, although the scope of the invention is not limited in this respect. In some embodiments, the cross correlation between two adjacent channels may equate to a channel isolation of greater than 20 dB, although the scope of the invention is not limited in this respect.

In some pseudo-orthogonal waveform embodiments, each of transmitter elements 102 may substantially simultaneously transmit pseudo-orthogonal waveform 103 on associated antenna element 104. In some embodiments, transmitter elements 102 may serve as transmission/rejection (T/R) modules, although the scope of the invention is not limited in this respect. In some embodiments, waveform processing and controller circuitry 112 may perform separate correlations on single digital waveform 111 for use in estimating a trajectory of an incoming target.

In some pseudo-orthogonal waveform embodiments, radar system 100 may include pseudo-orthogonal code generator 114 to generate pseudo-orthogonal codes 115 for use with an associated one of transmitter elements 102. In some embodiments, pseudo-orthogonal code generator 114 is optional and the codes may be generated elsewhere. In these embodiments, one or more of unique pseudo-orthogonal codes 103 may be stored in each of transmitter elements 102, although the scope of the invention is not limited in this respect. In some embodiments, pseudo-orthogonal codes may be generated from a Walsh seed matrix, although the scope of the invention is not limited in this respect.

In some embodiments, radar system 100 may include signal combiner 106 to sum the return signals received by antenna elements 104 into single receiver channel signal 107 and one or more analog-to-digital (A/D) converters 110 to digitize single receiver channel signal 109 and to generate single digital waveform 111.

In some embodiments, radar system 100 may include receiver circuitry 108 to downconvert single receiver channel signal 107. In some embodiments, receiver circuitry 108 may downconvert individual return signals 105 from each antenna element 104 prior to the combining, although the scope of the invention is not limited in this respect.

In some embodiments, A/D converters 110 may comprise a single A/D converter to generate single digital waveform 111. In other embodiments, A/D converters 110 may comprise two or more A/D converters to generate single digital waveform 111 comprising, for example, an in-phase (I) component and a quadrature phase (Q) component. This may allow A/D converters 110 to operate at a lower sampling rate, although the scope of the invention is not limited in this respect.

In some embodiments, the antenna elements 104 together may cover a detection zone of up to 360-degrees in azimuth and may cover a detection angle of up to sixty degrees or greater in elevation, although the scope of the invention is not limited in this respect. These embodiments are discussed in more detail below.

In some embodiments, radar system 100 may also include RF signal generator 116 to generate RF signals 117 for each of transmitter elements 102. RF signals 117 may be substantially in-phase with each other and may be at the same frequency. In some embodiments, RF signals 117 may be continuous-wave (CW) signals, while in other embodiments RF signals 117 may be pulsed. Any radar frequency may be suitable for RF signals 117.

In some embodiments, radar system 100 may also include amplifiers, such as low-noise amplifiers (LNAs), circulators and other circuitry, some of which are illustrated in FIG. 1.

In some quadratic polyphase waveform embodiments, radar system 100 may be a quadratic polyphase waveform radar. In these embodiments, each of RF signals 117 for transmitter elements 102 may have a frequency spacing/separation therebetween. The frequency offset may be based on the target's Doppler including its anticipated velocity and the transmit frequency of these embodiments of radar system 100.

In these quadratic polyphase waveform embodiments, frequency offset versions of a single quadratic poly-phase waveform may be simultaneously transmitted on each antenna element. The return signal may be summed from each antenna element into a single receive channel. Each antenna channel and range gate may be may be decoded based on the different transmitted frequencies of this embodiment. In some embodiments, the use of stretch processing may allow radar system 100 to lower it's bandwidth without reducing range resolution.

In some quadratic polyphase waveform embodiments, transmitter elements 102 may simultaneously transmit frequency separated versions of a single quadratic polyphase waveform on the plurality of transmit antennas 104. Signal combiner 106 may combine a return signal from each antenna 104 into a combined time-domain signal (i.e., a single channel receiver signal). FFT processing circuitry may perform a Fourier transformation on the combined time-domain signal for use in locating a target.

In these quadratic polyphase waveform embodiments, transmitter elements 102 comprise polyphase modulators to generate the quadratic polyphase waveform having a series of phase states and transmitter elements 102 may serially transmit each phase state of the waveform with a time offset therebetween simultaneously on each of the transmit antennas.

In some quadratic polyphase waveform embodiments, the frequency separated versions of each phase state of the waveform that are simultaneously transmitted on each of antennas 104 are orthogonal in frequency. In some embodiments, the waveforms are transmitted on each of the antennas with a frequency spacing therebetween. The frequency spacing may be inversely related to a code length of the waveforms.

In some quadratic polyphase waveform embodiments, a polyphase modulator for each transmitter element 102 may generate a waveform for each transmit antenna from a quadratic phase code. The phase states of the waveform may be determined from $(\pi n^2)/N$, where n is a phase state number and ranges from one to a total number of the phase states, and where N is a total number of the phase states. In some embodiments, N may be greater than or equal to sixteen and less than or equal to 128, although the scope of the invention is not limited in this respect.

In some quadratic polyphase waveform embodiments, A/D circuitry 110 may be high-speed analog-to-digital conversion circuitry which may be used to directly sample a combined time-domain return signal to generate a combined digital time-domain signal (i.e., without downconversion). In these embodiments, a correlator may be used to correlate the combined digital time-domain signal with the transmitted quadratic polyphase waveform prior to the performance of the Fourier transformation. In these embodiments, it should be noted that there is only one waveform transmitted, but there are a number of phase states of the waveform.

In some quadratic polyphase waveform embodiments that employ stretch processing, a downconverter may be used to downconvert the combined time-domain signal by mixing it with a time-shifted version of a quadratic phase code used to generate the waveform. In these embodiments, the downconverter may generate a frequency output for use in identifying the target.

In some of these quadratic polyphase waveform embodiments, each transmitter element may be associated with an antenna element and the antenna elements may be positioned to substantially cover a detection zone of approximately 360 degrees in azimuth and up to sixty degrees in elevation, although the scope of the invention is not limited in this respect. In some embodiments, the antenna elements may comprise a first set of antenna elements positioned with respect to a first elevation and a second set of antenna elements positioned with respect to a second elevation.

In some quadratic polyphase waveform embodiments, the radar system may include a target locator to locate the target from frequency-domain outputs provided by the Fourier transformation circuitry. These frequency-domain outputs may comprise spectral lines corresponding to a channel, a range gate and a Doppler associated with the target.

Figure 2:
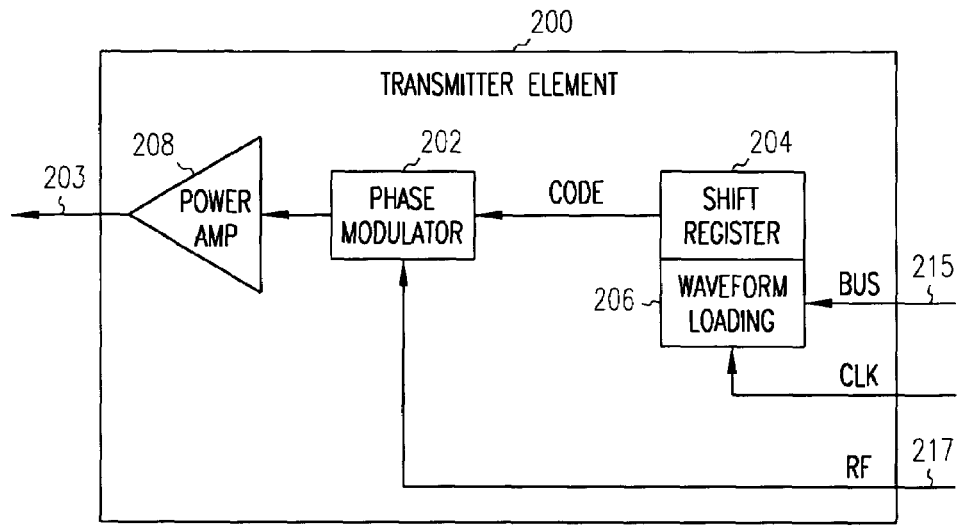
FIG. 2 is a functional block diagram of a transmitter element in accordance with some embodiments of the present invention.

FIG. 2 is a functional block diagram of a transmitter element in accordance with some embodiments of the present invention. Transmitter element 200 may be suitable for use as one or more of transmitter elements 102 (FIG. 1), although other transmitter circuitry or transmitter modules may also be suitable.

In some pseudo-orthogonal waveform embodiments, transmitter element 200 may comprise phase modulator 202 to phase modulate RF signal 217 with pseudo-orthogonal code 215 to generate pseudo-orthogonal waveform 203 for transmission by one of antenna elements 104 (FIG. 1). In FIG. 2, RF signal 217 may correspond to one of RF signals 117 (FIG. 1), pseudo-orthogonal code 215 may correspond to one of pseudo-orthogonal codes 115 (FIG. 1), and pseudo-orthogonal waveform 203 may correspond to one of pseudo-orthogonal waveforms 103 (FIG. 1).

Phase modulator 202 may be any type of phase modulator. In some embodiments, phase modulator 202 may be a bi-phase modulator to phase modulate RF signal 217 with a phase of either substantially zero degrees or substantially one-hundred eighty degrees in accordance with ones and zeros of pseudo-orthogonal code 215, although the scope of the invention is not limited in this respect. In some embodiments, phase modulator 202 may be a poly-phase modulator.

In some pseudo-orthogonal waveform embodiments, transmitter element 200 may include shift register 204 and waveform-loading element 206. Shift register 204 may serially provide bits of pseudo-orthogonal code 215 to phase modulator 202, and waveform-loading element 206 may provide the associated pseudo-orthogonal code 215 to shift register 204. In some embodiments, each waveform-loading element 206 of transmitter elements 102 (FIG. 1) may store a unique pseudo-orthogonal code. In some embodiments, waveform-loading element 206 may be coupled to pseudo-orthogonal code generator 114 (FIG. 1) by a bus or other communication path allowing different pseudo-orthogonal codes to be received from code generator 114 (FIG. 1). In these embodiments, waveform-loading element 206 may be addressable allowing the pseudo-orthogonal code to be updated. Addressable loading may provide code agility for potentially greater channel to channel isolation than may be possible with only one code set, which may result in a potentially higher probability of detection, even for multiple projectile situations.

In some pseudo-orthogonal waveform embodiments, waveform-loading element 206 may temporarily or permanently store a pseudo-orthogonal code therein. In these other embodiments, pseudo-orthogonal code generator 114 (FIG. 1) may be optional and may not necessarily be part of system 100, although the scope of the invention is not limited in this respect.

In some embodiments, transmitter element 200 may include power amplifier 208 to amplify the pseudo-orthogonal waveform provided by phase modulator 202 for transmission on an associated antenna element. In some embodiments, pseudo-orthogonal waveform 103 may be a bi-phase modulated RF waveform.

In some embodiments, transmitter element 200 may include other elements (not illustratated) that may be useful for modulation and amplification of signals for transmission. For example, in some pulse-radar embodiments, transmitter element 200 may include a switching element to allow RF signal 217 to be pulsed prior to modulation, although the scope of the invention is not limited in this respect.

Figure 3:
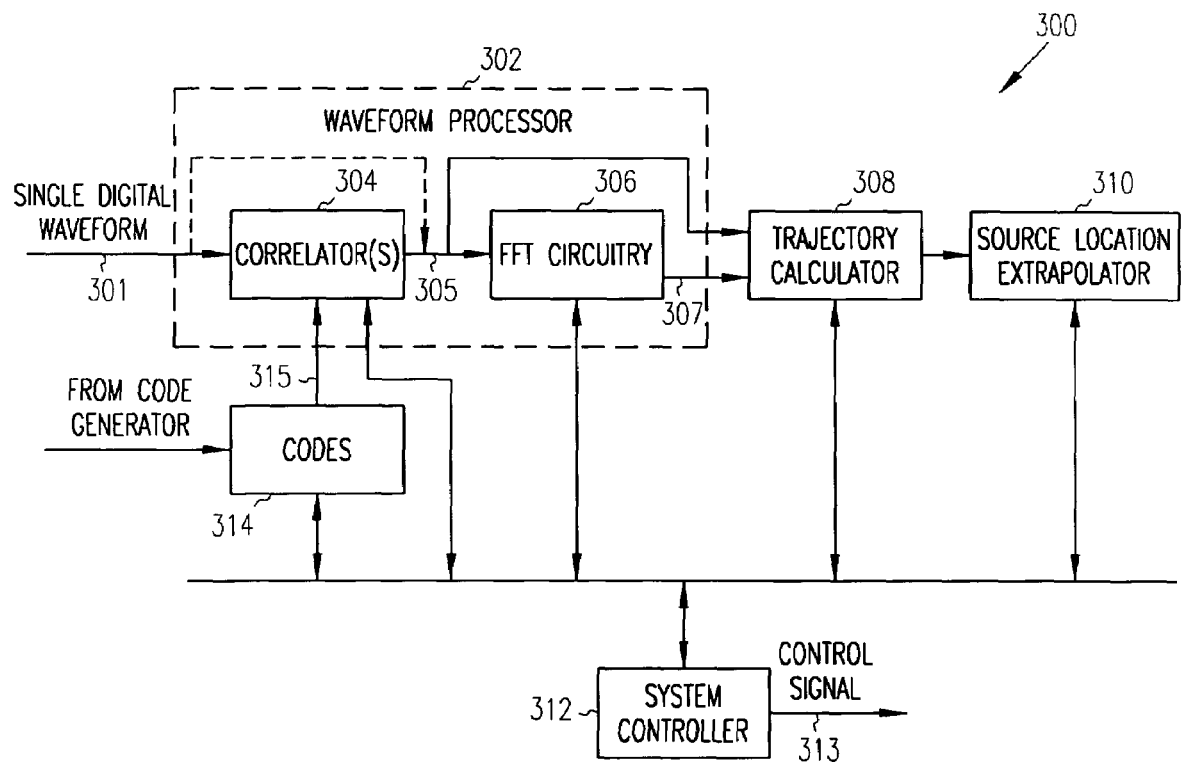
FIG. 3 is a functional block diagram of waveform processing and controller circuitry in accordance with some embodiments of the present invention.

FIG. 3 is a functional block diagram of waveform processing and controller circuitry in accordance with some embodiments of the present invention. Waveform processing and controller circuitry 300 may be suitable for use as waveform processing and controller circuitry 112 (FIG. 1), although other circuitry may also be suitable. Waveform processing and controller circuitry 300 may include waveform processor 302 to operate on single digital waveform 301, which may correspond to single digital waveform 111 (FIG. 1). In these embodiments, single digital waveform 301 may include return signal components received from each of antenna elements 104 (FIG. 1).

Waveform processor 302 may comprise one or more correlators 304 to perform correlations on digital waveform 301 with each of a plurality of pseudo-orthogonal codes 315 to generate correlation output signals 305. Pseudo-orthogonal codes 315 may correspond to pseudo-orthogonal codes 115 (FIG. 1) and may include all codes used in generating the transmitted waveforms. Waveform processor 302 may also comprise fast-Fourier transform (FFT) circuitry 306 to perform FFTs on correlation output signals 305 from the one or more correlators 304 for use in estimating a trajectory of a target.

In some pseudo-orthogonal waveform embodiments, correlators 304 may comprise a single correlator to individually (e.g., serially or sequentially) perform a correlation on single digital waveform 301 for each of pseudo-orthogonal codes 315. In some pseudo-orthogonal waveform embodiments, correlators 304 may comprise a plurality of individual correlators to perform simultaneous correlations with more than one of the pseudo-orthogonal codes 315 on single digital waveform 301, although the scope of the invention is not limited in this respect. In some embodiments, each of pseudo-orthogonal codes 315 may be stored in storage element 314 and may be provided by pseudo-orthogonal code generator 114 (FIG. 1), although the scope of the invention is not limited in this respect.

In some embodiments, waveform processing and controller circuitry 300 may also include trajectory calculator 308 to interpolate between correlation output signals 305 associated with different antenna elements (i.e., different codes) to estimate an angular position (e.g., an azimuth angle and/or elevation angle) of the target.

In some embodiments, waveform processing and controller circuitry 300 may also include source location extrapolator 310 to estimate a source location of the target based on the target's trajectory. In some embodiments, source location extrapolator 310 may extrapolate the trajectory to determine a source location. This is described in more detail below.

In some embodiments, waveform processing and controller circuitry 300 may also include system controller 312 which may help control the overall operation of system 100 (FIG. 1). In some embodiments, system controller 312 may generate control signal 313 which may be used to initiate or launch a counter weapon at the source location. In some embodiments, control signal 313 may be used to intercept the target. In these embodiments, control signal 313 may include location coordinates of the source location or may include trajectory information. These embodiments are also described in more detail below.

Although radar system 100 (FIG. 1), transmitter element 200 (FIG. 2), and waveform processing and controller circuitry 300 (FIG. 3) are illustrated as having several separate functional elements, one or more of the functional elements may be combined and may be implemented by combinations of software-configured elements, such as processing elements including digital signal processors (DSPs), and/or other combinations of hardware elements. For example, some elements may comprise one or more microprocessors, DSPs, application specific integrated circuits (ASICs), and combinations of various hardware and logic circuitry for performing at least the functions described herein. In some embodiments, one processing element may perform the operations of trajectory calculator 308, source extrapolator 310 and system controller 312 for example, although the scope of the invention is not limited in this respect.

Figure 4A:
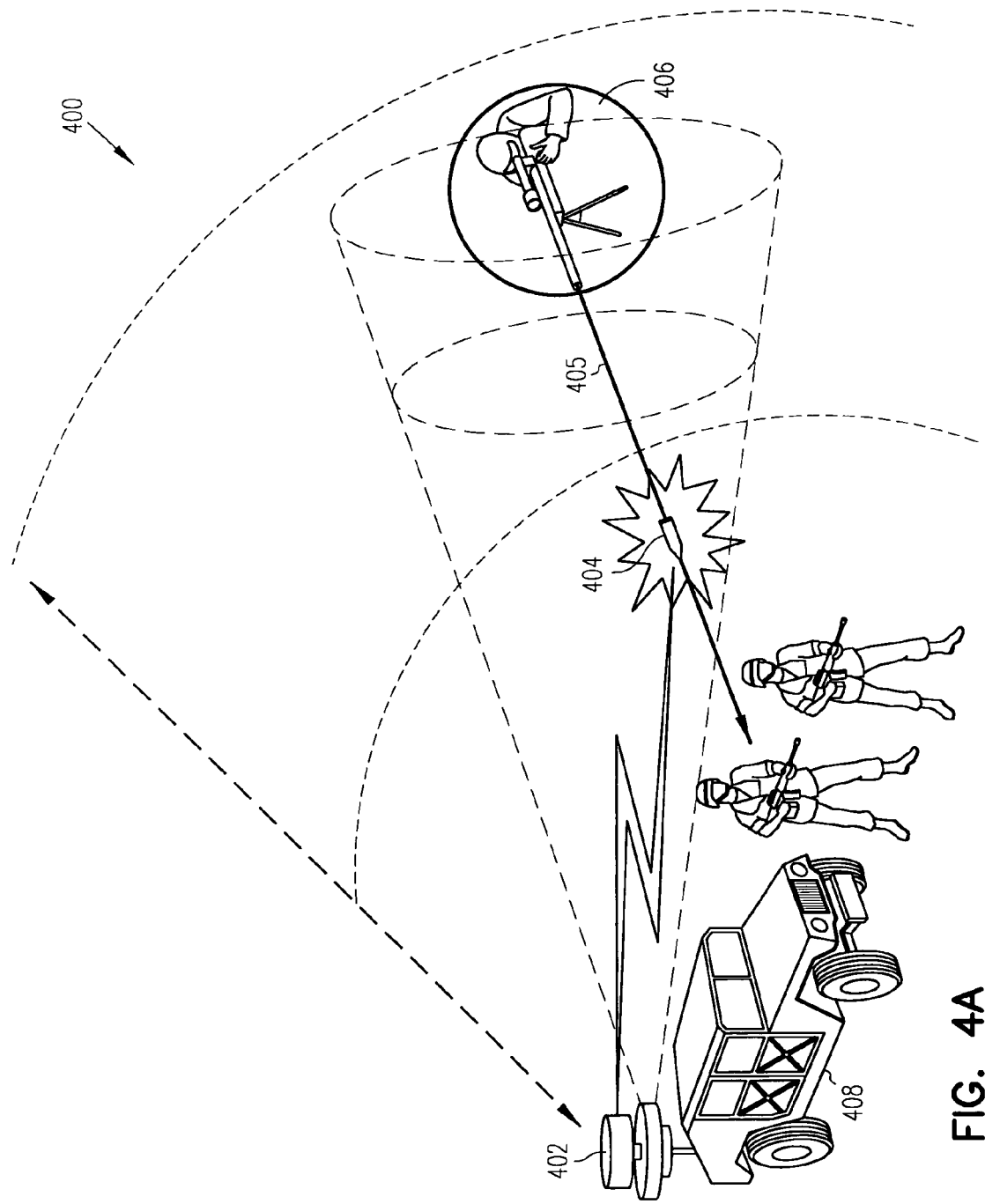
FIGS. 4A, 4B & 4C illustrate operational environments radar systems in accordance with some embodiments of the present invention.
Figure 4B:
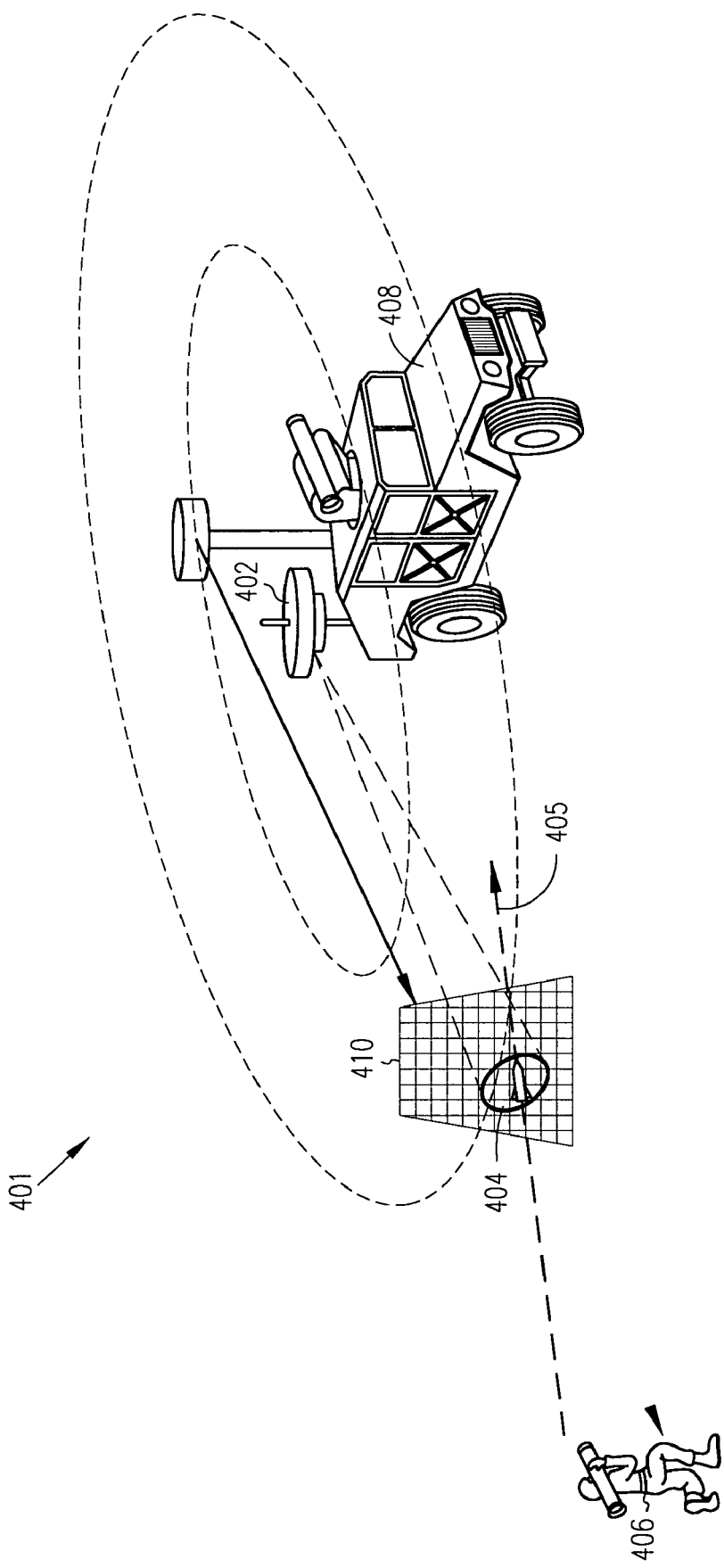
Figure 4C:
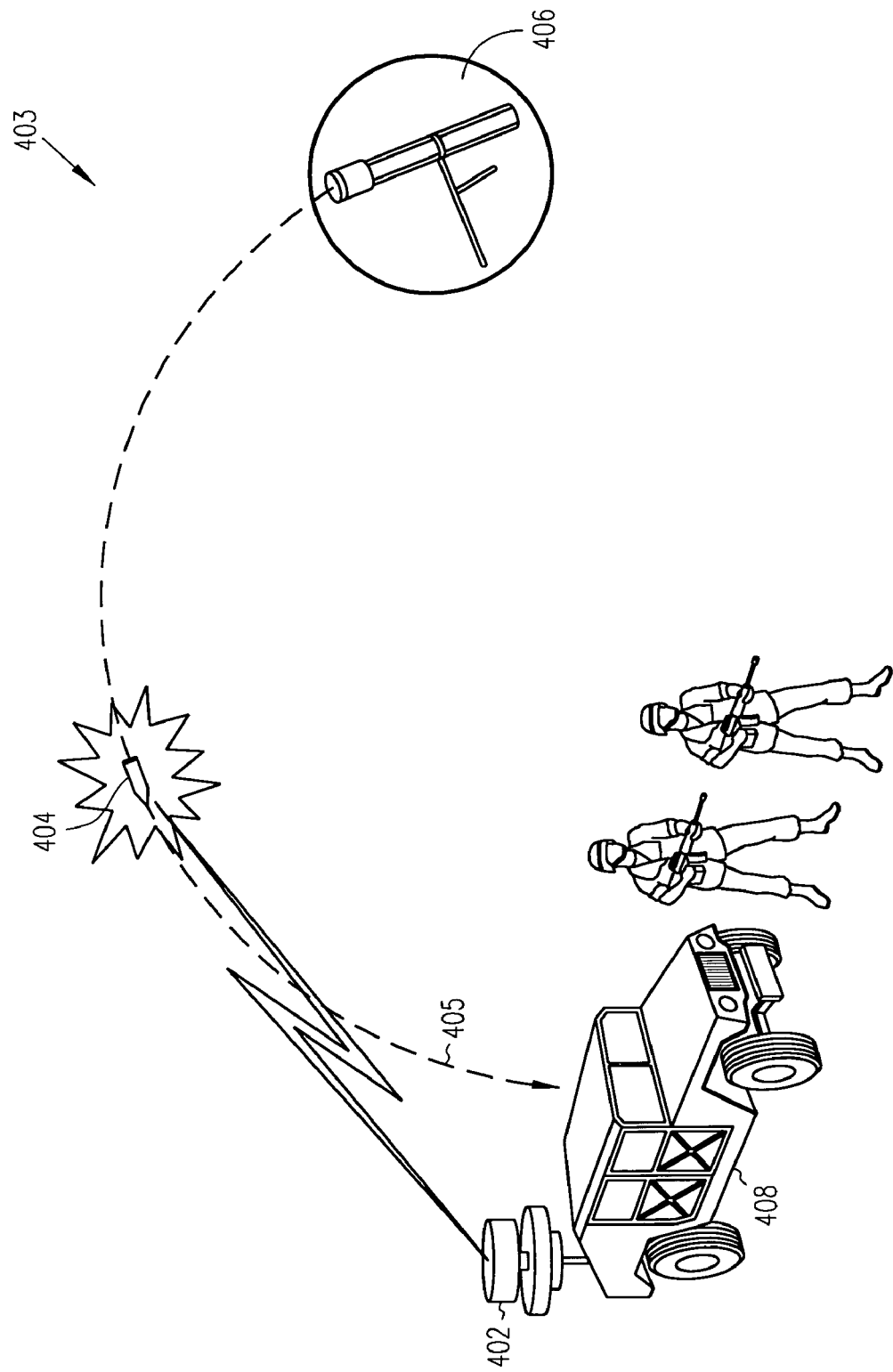

FIGS. 4A, 4B & 4C illustrate operational environments a radar system in accordance with some embodiments of the present invention. FIG. 4A illustrates an example of extrapolating a sniper's location based on the trajectory of a sniper's bullet. FIG. 4B illustrates an example of the detection and interception of a rocket propelled grenade. FIG. 4C illustrates an example of the detection of the incoming mortar shell from a firing source and the extrapolation of the mortar's trajectory.

In operational environments 400 (FIG. 4A), 401 (FIG. 4B) and 403 (FIG. 4C), radar system 402 may correspond to radar system 100 (FIG. 1). In some embodiments, radar system 402 may estimate trajectory 405 of target 404 (e.g., bullet, RPG, or mortar shell), and may extrapolate source location 406 from trajectory 405. In some embodiments, radar system 402 may be locatable on mobile or vehicular platform 408, although the scope of the invention is not limited in this respect.

Referring to FIG. 3, in some embodiments, FFT circuitry 306 may perform FFTs on correlation output signals 305 from the one or more correlators 304 for use in estimating trajectory 405 of target 404. In some embodiments, trajectory calculator 308 may estimate a velocity and/or acceleration of target 404 based on frequency-domain samples 307 provided by the FFT circuitry 306. In some embodiments, trajectory calculator 308 may also estimate a range of target 404 based on a sample rate of A/D converters 110 (FIG. 1) used to digitize combined return signals 109 (FIG. 1), although the scope of the invention is not limited in this respect.

In some embodiments, trajectory calculator 308 may calculate trajectory 405 using an angular position, a velocity and/or acceleration, and a range. The angular position may include an azimuth angle and/or an elevation angle. In some embodiments, the trajectory calculator 308 may identify the particular one or more of antenna elements 104 (FIG. 1) that receive return signals based on the correlation outputs to determine the azimuth and/or elevation angle of the target. In some embodiments, trajectory calculator 308 may be able to refine the estimate of the azimuth and/or elevation angle based on the relative magnitude of the correlations associated with the different antenna elements.

In some embodiments, the trajectory may be defined by an azimuth angle, an elevation angle, a velocity and/or an acceleration/deceleration, and/or a range of a target. In some embodiments, trajectory calculator 308 may further estimate a projectile trajectory 405 based on radar cross section target 404. The radar cross section may provide a signature for the type of weapon.

In some embodiments, source location extrapolator 310 may estimate source location 406 of target 404 based on trajectory 405. In some embodiments, the source location extrapolator 310 may extrapolate trajectory 405 to determine source location 406. In some embodiments, source location 406 may be the location of where target 404 may have been launched.

In some embodiments, source location 406 may be defined in terms of coordinates relative to system 402. In other embodiments, source location 406 may be defined in terms of absolute geographic or global-positioning coordinates, although the scope of the invention is not limited in this respect. In some embodiments, system 402 may include a positioning system receiver, such as a global positioning system GPS receiver (not separately illustrated) to generate geographic location coordinates of system 402 as well as location coordinates of source location 406 based on the location coordinates of system 402. In some embodiments, the geographic location coordinates of source location 406 may be sent to another system for use in destroying or eliminating the source, although the scope of the invention is not limited in this respect.

In some embodiments, system controller 312 may generate control signal 313 to control and/or direct/guide interceptor 410 toward target 404 based on trajectory 405. In these embodiments, interceptor 410 may have been previously launched and may be directed toward target 404 once trajectory 405 of target 404 is determined. Interceptor 410 may include any type of counter weapon or projectile, although the scope of the invention is not limited in this respect.

In some embodiments, target 404 may comprise at least one of an incoming projectile, a bullet, a rocket, a rocket propelled grenade (RPG), and a networked munition. In some embodiments, the antenna elements of system 402 may be arranged together cover a detection zone of up to approximately 360-degrees in azimuth and a detection angle of up to sixty degrees or greater in elevation. This is described in more detail below.

FIGS. 5A and 5B illustrate antenna element configurations in accordance with some embodiments of the present invention. In FIG. 5A, antenna configuration 501 comprises a plurality of antenna elements 503 arranged circumferentially in a single layer. In these embodiments, each of antenna elements 503 may correspond to one of antenna elements 104 (FIG. 1). In FIG. 5B, antenna configuration 505 comprises a first set 502 of antenna elements 507 and a second set 504 of antenna elements 507. In these embodiments, each of antenna elements 507 may correspond to one of antenna elements 104 (FIG. 1). First set 502 may be positioned with respect to a first elevation and second set 504 may be positioned with respect to a second elevation. Antenna configuration 505 may be used to provide enhanced elevation angular resolution. In some pseudo-orthogonal waveform embodiments, trajectory calculator 308 (FIG. 3) may estimate an elevation angle of a target based on differences between correlation output signals 305 (FIG. 3) associated with codes used in transmitting the pseudo-orthogonal waveforms on the antenna elements of first set 502 and second set 504 of configuration 505, although configuration 501 may also be used to estimate an elevation angle of a target.

In some embodiments, antenna elements 503 may comprise horn antennas although the scope of the invention is not limited in this respect. In some embodiments, antenna elements 507 may comprise horn antennas in a stacked configuration, although the scope of the invention is not limited in this respect. In some embodiments, the number of antenna elements of either configuration 501 or 505 may vary from as little as four to as much as sixteen or greater depending on the application requirements and the beamwidth of the antenna elements.

FIG. 6 illustrates a detection zone and a detection angle of a radar system in accordance with some embodiments of the present invention. Antenna elements 601 may be positioned circumferentially to, in combination, cover detection zone 602 of up to approximately 360-degrees in azimuth and detection angle 604 of up to sixty degrees or greater in elevation, although the scope of the invention is not limited in this respect. Antenna elements 601 may correspond to antenna elements 503 (FIG. 5A) or antenna elements 507 (FIG. 5B).

Although some embodiments of the present invention are described with respect to antenna elements positioned circumferentially, this is not a requirement. In other embodiments, antenna elements may be positioned in other ways, such as on a flat, spherical or other surface depending on the application.

Figure 7A:
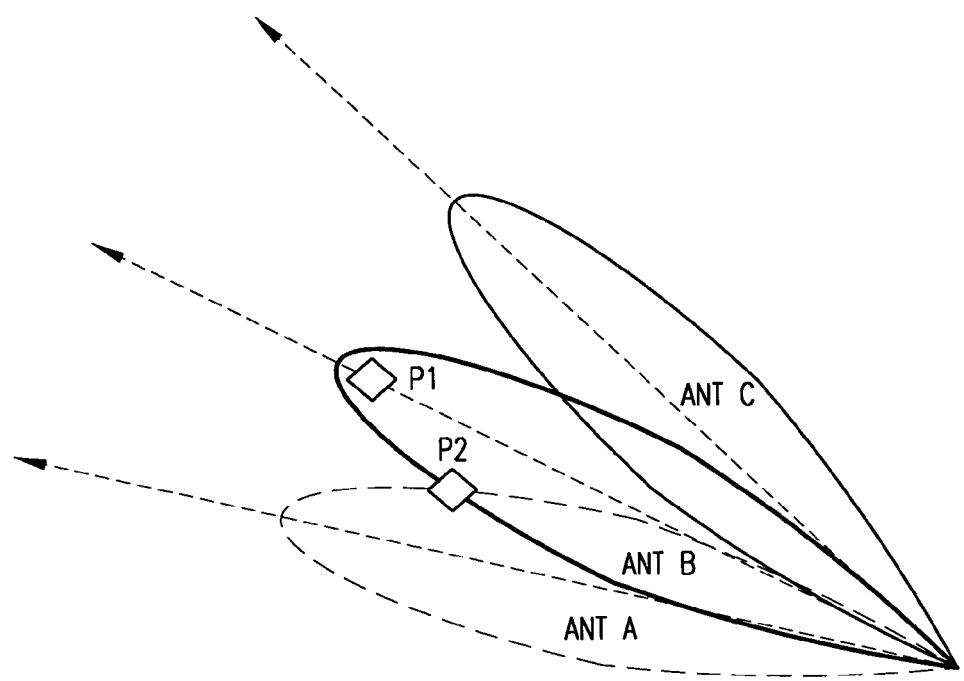
FIGS. 7A, 7B & 7C illustrate examples of target locations in antenna beams and magnitudes of associated correlation output signals in accordance with some embodiments of the present invention.
Figure 7B:
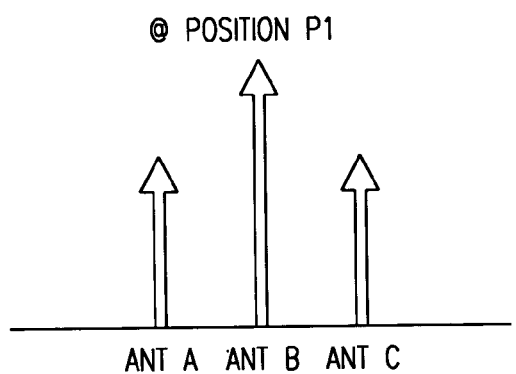
Figure 7C:
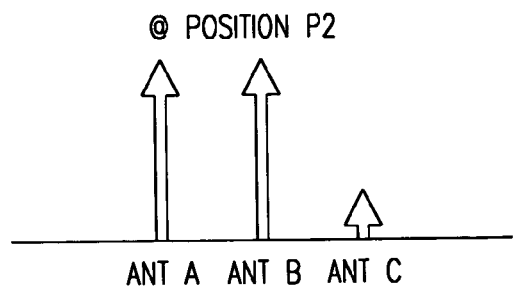

FIGS. 7A, 7B & 7C illustrate examples of target locations in antenna beams and magnitudes of associated correlation output signals in accordance with some embodiments of the present invention. FIG. 7A illustrates three antenna beams (i.e., antenna A, antenna B and antenna C) which may correspond to antenna beams of three of antenna elements 104 (FIG. 1). FIG. 7B illustrates the relative magnitude of correlations produced by the correlation of return signals associated with the three antennas of FIG. 7A for a target in position P1. The correlations may be provided as correlation outputs by correlators 304 (FIG. 3) by performing correlations on single digital waveform 301 (FIG. 3).

As illustrated in FIG. 7B, antenna B provides the greatest correlation output magnitude, while antennas A and C provide lower and approximately equal correlation output magnitudes. This may indicate that the target is located in an angular position toward the center of the antenna beam associated with antenna B.

As illustrated in FIG. 7C, antennas A and B provide greater and approximately equal correlation output magnitudes, while antenna C provides a much lower correlation output magnitude. This may indicate that the target is now located in an angular position approximately equally between antennas A and B, and further from antenna C.

The correlation outputs for antenna A illustrated in FIGS. 7B and 7C may be generated by correlating the pseudo-orthogonal code used in generating the pseudo-orthogonal waveform that was transmitted on antenna A with the combined return signal. The correlation outputs for antenna B illustrated in FIGS. 7B and 7C may be generated by correlating the pseudo-orthogonal code used in generating the pseudo-orthogonal waveform that was transmitted on antenna B with the combined return signal. The correlation outputs for antenna C illustrated in FIGS. 7B and 7C may be generated by correlating the pseudo-orthogonal code used in generating the pseudo-orthogonal waveform that was transmitted on antenna C with the combined return signal.

In some embodiments, the antenna elements may be arranged to cover various angles in both elevation and azimuth. As illustrated in FIGS. 7A, 7B & 7C, correlation outputs may be used to accurately estimate angular positions of a target. In some embodiments, the antenna beams illustrated in FIG. 7A may be directed to cover various azimuth angles; although, in other embodiments, the antenna beams illustrated in FIG. 7A may be directed to cover various elevation angles.

Figure 8:
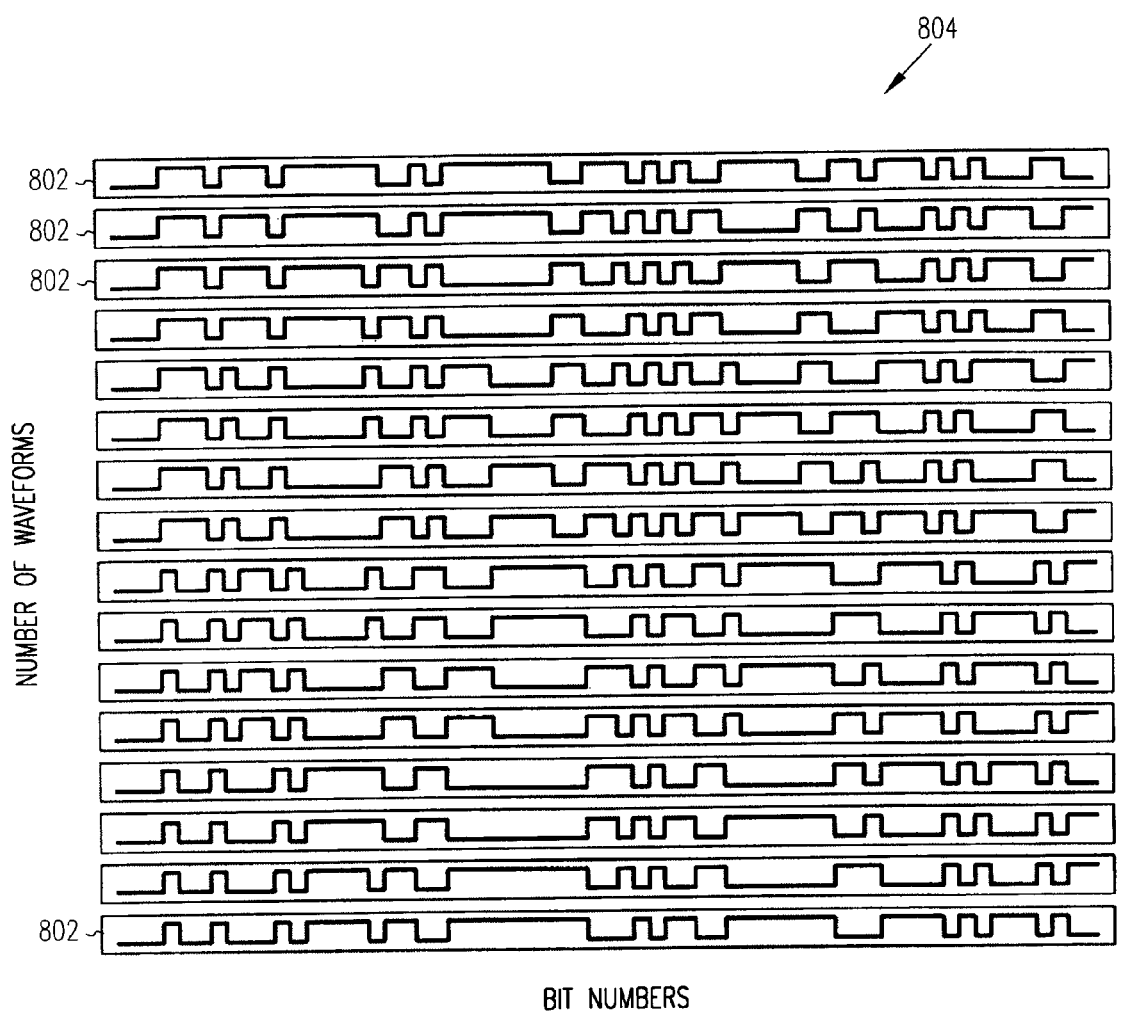
FIG. 8 illustrates examples of bit values for phase-modulation of pseudo-orthogonal waveforms in accordance with some embodiments of the present invention.

FIG. 8 illustrates examples of bit-values for phase-modulation of pseudo-orthogonal waveforms in accordance with some pseudo-orthogonal waveform embodiments of the present invention. In this example, sixteen 64-bit bi-phase modulated orthogonal transmit waveforms 802 are illustrated and may be used for transmission on sixteen of antenna elements 104 (FIG. 1). Bit values for each waveform may be associated with bit numbers 804 and may correspond to bits of the pseudo-orthogonal codes, such as pseudo-orthogonal codes 115 (FIG. 1). In theses embodiments, a dot product between any two of the codes may be substantially zero (e.g., more than 20 dB lower than the correlation peak).

Figure 9:
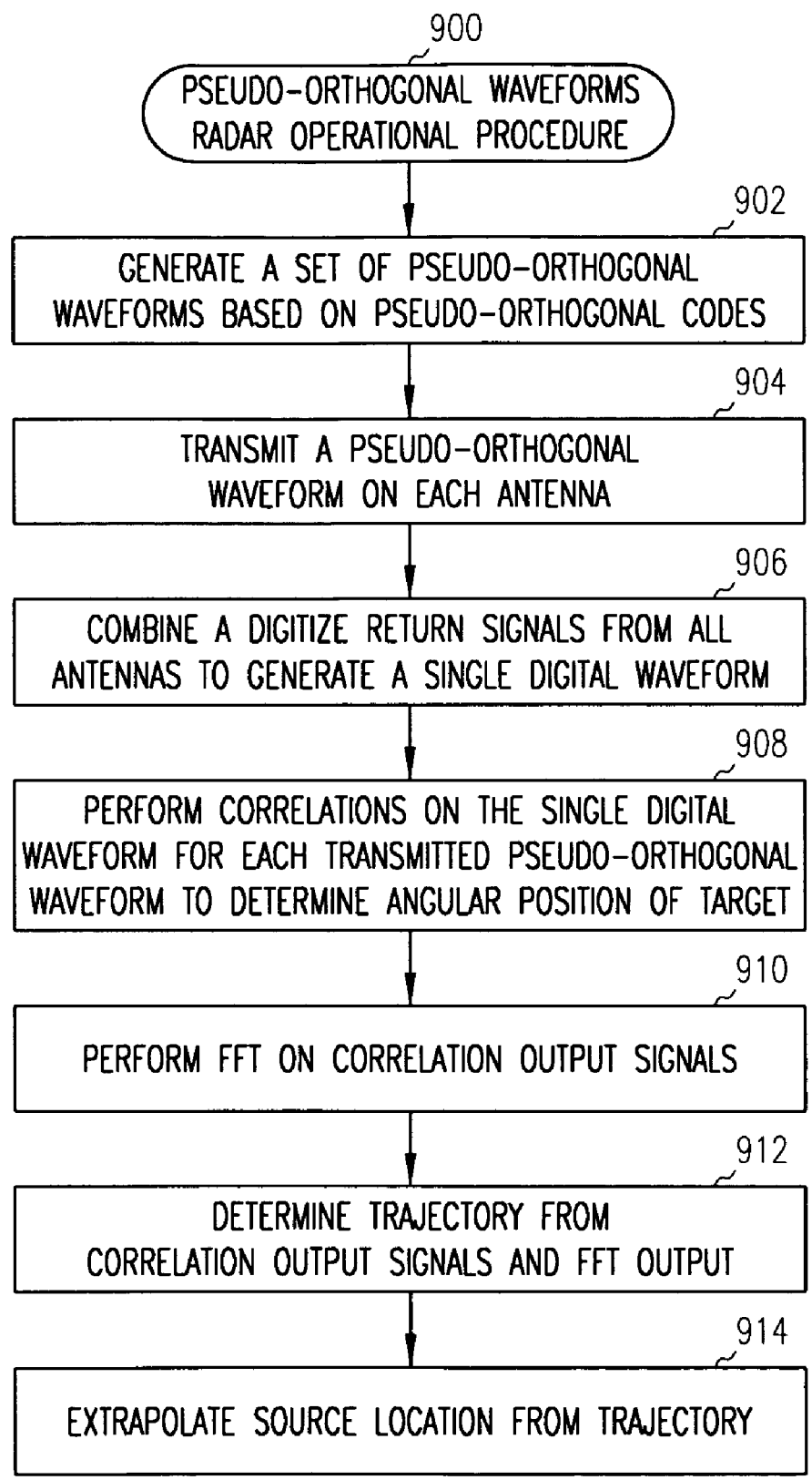
FIG. 9 is a flow chart of an operational procedure of a pseudo-orthogonal waveforms radar system in accordance with some embodiments of the present invention.

FIG. 9 is a flow chart of an operational procedure of a radar system in accordance with some embodiments of the present invention. Operation procedure 900 may be performed by a pseudo-orthogonal waveforms radar system, such as the pseudo-orthogonal waveform embodiments of radar system 100 (FIG. 1), although other pseudo-orthogonal waveforms radar system configurations may also be suitable to perform procedure 900.

Operation 902 generates a set of pseudo-orthogonal waveforms based on pseudo-orthogonal codes. In some embodiments, an RF signal may be phase-modulated by each of a plurality of phase modulators with phases of substantially zero and one-hundred eighty degrees based on bits of an associated one of the pseudo-orthogonal codes. In some embodiments, the pseudo-orthogonal codes may be generated and stored for use by the phase modulators. In some embodiments, transmitter elements 102 (FIG. 1) may perform operation 902.

Operation 904 comprises transmitting each of the pseudo-orthogonal waveforms on an associated antenna element, such as antenna elements 104 (FIG. 1). In some embodiments, the pseudo-orthogonal waveforms may be transmitted on each of the antenna elements. In some embodiments, the generating and transmitting of the pseudo-orthogonal waveforms in operations 902 and 904 may be performed substantially simultaneously, although the scope of the invention is not limited in this respect.

Operation 906 comprises receiving return signals through at least some of the antenna elements, and combining and digitizing the return signals to generate a single digital waveform, such as single digital waveform 111 (FIG. 1). Operation 906 may be performed by receiver elements of system 100 (FIG. 1) such as signal combiner 106 (FIG. 1), receiver circuitry 108 (FIG. 1) and A/D converters 110 (FIG. 1), although the scope of the invention is not limited in this respect.

Operation 908 comprises performing correlations on the single digital waveform for each of the pseudo-orthogonal codes used for generating the pseudo-orthogonal waveforms that were transmitted in operation 904. A correlation with a pseudo-orthogonal code may be used to determine the angular position of the target based on which antenna transmitted the associated waveform. In some embodiments, an interpolation between correlations from more than one antenna element may be used to improve the angular position estimate of the target. In some embodiments in which the antennas are positioned both with respect to azimuth angle and elevation angle, as illustrated in FIGS. 5A and 5B, an interpolation between correlation output signals may be used to estimate the angular position of the target in both azimuth and elevation, although the scope of the invention is not limited in this respect. In some embodiments, the correlations may be performed serially for each pseudo-orthogonal code, while in other embodiments; some of the correlations may be performed simultaneously. In some embodiments, operation 908 may be performed by correlators 304 (FIG. 3) of waveform processor 302 (FIG. 3), although the scope of the invention is not limited in this respect.

Operation 910 comprises performing an FFT on the correlation output signals generated in operation 908. The FFT may generate frequency-domain samples which may be used to determine velocity and/or acceleration of the target. In some embodiments, operation 910 may be performed by FFT circuitry 306 (FIG. 3).

Operation 912 comprises determining a trajectory of the target. The trajectory may be determined from the angular position, velocity, acceleration, and/or range of the target. Operation 912 may be performed by trajectory calculator 308 (FIG. 3) which may use a sample rate of the A/D converter to determine range information, although the scope of the invention is not limited in this respect. In some embodiments, operation 912 may also comprise generating a control signal to launch an interceptor at the target based on the trajectory, although the scope of the invention is not limited in this respect.

Operation 914 comprises extrapolating a source location based on the trajectory. Operation 914 may be optional and may be performed by source location extrapolator 310 (FIG. 3). In some embodiments, operation 914 may also comprise generating a control signal to launch a counter weapon or counter attack at the source location, although the scope of the invention is not limited in this respect.

Although the individual operations of procedure 900 are illustrated and described as separate operations, one or more of the individual operations may be performed concurrently, and nothing requires that the operations be performed in the order illustrated. Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Figure 10:
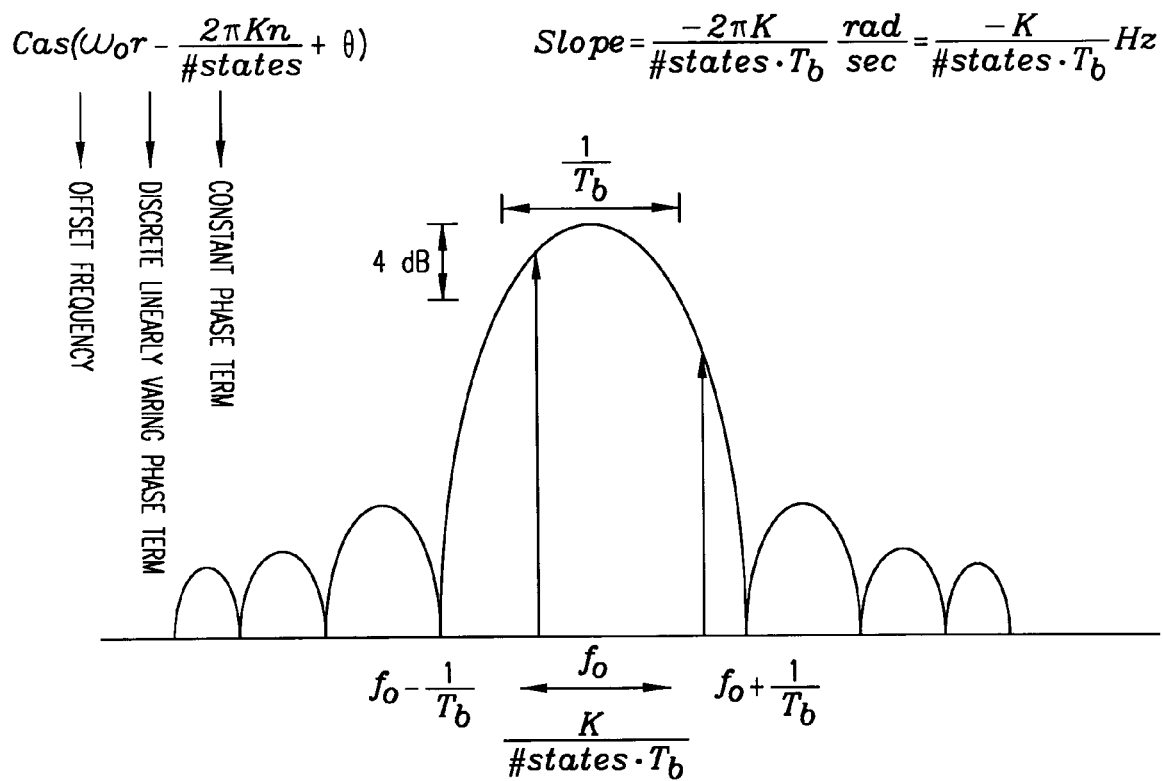
FIG. 10 illustrates a frequency spectrum associated with a quadratic polyphase waveform radar system in accordance with some embodiments of the present invention.

FIG. 10 illustrates a frequency spectrum associated with a quadratic polyphase waveform radar system in accordance with some embodiments of the present invention. As illustrated in FIG. 10, some embodiments of the quadratic polyphase waveform radar system may provide near-zero range side lobes. The ability to take advantage of stretch processing may allow the use of narrow-bandwidth analog-to-digital conversion circuitry without a reduction in range resolution.

FIG. 11 illustrates some example parameters for a quadratic polyphase waveform radar system in accordance with some embodiments of the present invention. The parameters illustrated in FIG. 11 may be suitable for a 360-degree configuration of a quadratic polyphase waveform radar system. In some of these embodiments, a radar frequency of around 6 GHz may be used with a maximum target velocity of 300 meters per second. In these embodiments, sixty four transmit channels (i.e., antennas) may be used with a frequency spacing of around 30 KHz. This may provide for a +/−12 KHz Doppler. A 2 MHz code length may be used to provide 64 channels of Doppler allowing the system to provide about 125 range gates of approximately 4 nanoseconds resulting in a resolution of about 0.6 meters.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A radar system comprising:
   transmitter elements to transmit a pseudo-orthogonal waveform on an associated one of a plurality of antenna elements;
   circuitry to combine and digitize return signals received by the antennas and generate a single digital waveform; and
   a waveform processor to perform correlations on the combined single digital waveform.

2. The system of claim 1 wherein each of the transmitter elements substantially simultaneously transmits a pseudo-orthogonal waveform on the associated antenna element, and wherein the waveform processor performs separate correlations on the combined single digital waveform for use in estimating a trajectory of a target.

3. The system of claim 1 wherein each of the transmitter elements comprises a phase modulator to phase modulate a radio-frequency (RF) signal with one of a plurality of pseudo-orthogonal codes to generate a pseudo-orthogonal waveform for transmission by the associated one of the antenna elements.

4. The system of claim 3 wherein a dot product of any two of the pseudo-orthogonal codes is substantially zero.

5. The system of claim 3 wherein the phase modulator of each transmitter element comprises a bi-phase modulator to phase modulate the RF signal with a phase of either substantially zero degrees or substantially one-hundred eighty degrees in accordance with ones and zeros of the associated one of the pseudo-orthogonal codes.

6. The system of claim 3 wherein each transmitter element further comprises:

a shift register to serially provide bits of the associated one of the pseudo-orthogonal codes to the phase modulator; and a waveform-loading element to provide the associated pseudo-orthogonal code to the shift register.

7. The system of claim 6 further comprising a pseudo-orthogonal code generator to generate the pseudo-orthogonal codes for association with each antenna element and to provide the associated one of the pseudo-orthogonal codes to the waveform-loading element of each transmitter element.

8. The system of claim 3 wherein the waveform processor comprises:

one or more correlators to correlate the single digital waveform with each of the pseudo-orthogonal codes; and fast-Fourier transform (FFT) circuitry to perform fast-Fourier transforms (FFTs) on correlation output signals from the one or more correlators for use in estimating a trajectory of a target.

9. The system of claim 8 wherein the one or more correlators comprises a single correlator to individually perform a correlation on the single digital waveform for each of the pseudo-orthogonal codes.

10. The system of claim 8 wherein the one or more correlators comprises a plurality of correlators to perform simultaneous correlations with more than one of the pseudo-orthogonal codes on the single digital waveform.

11. The system of claim 8 further comprising a trajectory calculator to interpolate between correlation output signals associated with different antennas to estimate an azimuth angle of the target.

12. The system of claim 11 wherein the plurality of antenna elements comprise a first set of antenna elements positioned with respect to a first elevation and a second set of antenna elements positioned with respect to a second elevation, and wherein the trajectory calculator is to further estimate an elevation angle of the target based on differences between correlation output signals associated with codes used in transmitting the pseudo-orthogonal waveforms on the antenna elements of the first and second sets.

13. The system of claim 11 wherein the trajectory calculator is to further estimate a velocity of the target based on frequency-domain samples provided by the FFT circuitry.

14. The system of claim 11 wherein the trajectory calculator is to further estimate a range of the target based on a sample rate of analog-to-digital conversion circuitry used to digitize the combined return signals.

15. The system of claim 11 wherein the trajectory calculator is to calculate the trajectory using an azimuth angle, a velocity, a range and an elevation angle.

16. The system of claim 11 further comprising a source location extrapolator to estimate a source location of the target based on the trajectory.

17. The system of claim 16 further comprising a system controller to generate a control signal to launch a counter weapon at the source location.

18. The system of claim 16 further comprising a positioning system receiver to generate location coordinates of the system, the positioning system to further generate location coordinates of the source location based on the location coordinates of the system.

19. The system of claim 8 further comprising a system controller to generate a control signal to control an interceptor toward the target based on the trajectory.

20. The system of claim 1 wherein the circuitry to combine and digitize comprises:

a signal combiner to sum the return signals received by the antennas into a single receiver channel signal; and one or more analog-to-digital (A/D) converters to digitize the single receiver channel signal and to generate the single digital waveform.

21. The system of claim 20 further comprising receiver circuitry to downconvert the single receiver channel signal.

22. The system of claim 8 wherein the antenna elements together cover a detection zone of approximately 360-degrees in azimuth and a detection angle of up to sixty degrees in elevation.

23. The system of claim 22 wherein the system is locatable on a vehicular platform.

24. The system of claim 23 wherein the target comprises at least one of an incoming projectile, a bullet, a rocket, a rocket propelled grenade (RPG), a mortar shell, and a networked munition.

25. The method of operating a radar system comprising:

transmitting a plurality of pseudo-orthogonal waveforms with spatially separated antenna elements;

combining and digitizing return signals to generate a single digital waveform; and perform correlations on the combined single digital waveform with pseudo-orthogonal codes associated with the pseudo-orthogonal waveforms.

26. The method of claim 25 further comprising phase modulating a radio-frequency (RF) signal with one of the pseudo-orthogonal codes to generate an associated pseudo-orthogonal waveform for transmission by one of the antenna elements, wherein a dot product of any two of the pseudo-orthogonal codes is substantially zero.

27. The method of claim 26 wherein phase modulating comprises bi-phase modulating the RF signal with a phase of either substantially zero degrees or substantially one-hundred eighty degrees in accordance with ones and zeros of the associated one of the pseudo-orthogonal codes, and wherein the method further comprises:

serially providing bits of the associated one of the pseudo-orthogonal codes for phase modulating the RF signal.

28. The method of claim 26 wherein performing correlations comprises performing correlations with each of the pseudo-orthogonal codes to generate correlation outputs, and
wherein the method further comprises:
performing fast Fourier transforms (FFTs) on the correlation output signals to generate frequency-domain samples; and
calculating a trajectory of a target from the correlation outputs and the frequency-domain samples.

29. The method of claim 28 wherein each of the antenna element is positioned with respect to different azimuth angles, and
wherein the correlation outputs indicate at least an azimuth angle of the target.

30. The method of claim 29 wherein some of the antenna elements are positioned with respect to different elevation angles, and wherein the correlation outputs further indicate an elevation angle of the target.

31. The method of claim 28 further comprising estimating a source location of the target based on the trajectory.

32. A system for locating a sniper comprising:
transmitter elements to transmit a pseudo-orthogonal waveform on an associated one of a plurality of antenna elements;
circuitry to combine and digitize return signals received by the antennas and generate a single digital waveform; and
a waveform processor to perform correlations on the combined single digital waveform for estimating a trajectory of a sniper's bullet.

33. The system of claim 32 wherein each of the transmitter elements comprises a phase modulator to phase modulate a radio-frequency (RF) signal with one of a plurality of pseudo-orthogonal codes to generate a pseudo-orthogonal waveform for transmission by the associated one of the antenna elements,
wherein the waveform processor comprises:
one or more correlators to correlate the single digital waveform with each of the pseudo-orthogonal codes; and
fast-Fourier transform (FFT) circuitry to perform fast-Fourier transforms (FFTs) on correlation output signals from the one or more correlators for use in estimating the trajectory.

34. The system of claim 33 further comprising:
a source location extrapolator to estimate a source location of the sniper's bullet based on the trajectory; and
a system controller to generate a control signal to launch a counter weapon at the source location.

35. The system of claim 34 wherein each of the transmitter elements substantially simultaneously transmits a pseudo-orthogonal waveform on the associated antenna element,
wherein the waveform processor performs separate correlations on the combined single digital waveform for use in estimating the trajectory, and
wherein each of the transmitter elements comprises a phase modulator to phase modulate a radio-frequency (RF) signal with one of a plurality of pseudo-orthogonal codes to generate a pseudo-orthogonal waveform for transmission by the associated one of the antenna elements.

36. A system for intercepting a projectile comprising:
transmitter elements to transmit a pseudo-orthogonal waveform on an associated one of a plurality of antenna elements;
circuitry to combine and digitize return signals received by the antennas and to generate a single digital waveform;
a waveform processor to perform correlations on the combined single digital waveform for estimating a trajectory of an projectile; and
a system controller to generate a control signal to control an interceptor toward the projectile based on the trajectory, the interceptor to attempt to intercept the projectile.

37. The system of claim 36 wherein each of the transmitter elements comprises a phase modulator to phase modulate a radio-frequency (RF) signal with one of a plurality of pseudo-orthogonal codes to generate a pseudo-orthogonal waveform for transmission by the associated one of the antenna elements,
wherein the waveform processor comprises:
one or more correlators to correlate the single digital waveform with each of the pseudo-orthogonal codes; and
fast-Fourier transform (FFT) circuitry to perform fast-Fourier transforms (FFTs) on correlation output signals from the one or more correlators for use in estimating the trajectory.

38. The system of claim 37 wherein each of the transmitter elements substantially simultaneously transmits a pseudo-orthogonal waveform on the associated antenna element,
wherein the waveform processor performs separate correlations on the combined single digital waveform for use in estimating the trajectory, and
wherein each of the transmitter elements comprises a phase modulator to phase modulate a radio-frequency (RF) signal with one of a plurality of pseudo-orthogonal codes to generate a pseudo-orthogonal waveform for transmission by the associated one of the antenna elements.

39. A quadratic polyphase waveform radar system comprising:
transmitter elements to simultaneously transmit frequency separated versions of a quadratic polyphase waveform on a plurality of transmit antennas;
a signal combiner to combine a return signal from each antenna into a combined time-domain signal; and
FFT processing circuitry to perform a Fourier transformation on the combined time-domain signal to locate a target.

40. The radar system of claim 39 wherein the transmitter elements comprise polyphase modulators to generate the quadratic polyphase waveform having a series of phase states,
wherein the transmitter elements serially transmit each phase state of the waveform with a time offset therebetween simultaneously on each of the transmit antennas, and
wherein the frequency separated versions of each phase state of the waveform simultaneously transmitted on each of the antennas are orthogonal in frequency.

41. The radar system of claim 40 wherein the waveforms are transmitted on each of the antennas with a frequency spacing therebetween, the frequency spacing being inversely related to a code length of the waveforms.

42. The radar system of claim 40 wherein the polyphase modulators generate the waveform for each transmit antenna from a quadratic phase code.

43. The radar system of claim 42 wherein the phase states of the waveform are determined from $(\pi n^2)/N$, wherein n is a phase state number and ranges from one to a total number of the phase states, and wherein N is a total number of the phase states and is greater than or equal to sixteen and less than or equal to 128.

44. The radar system of claim 42 further comprising:

high-speed analog-to-digital conversion circuitry to directly sample a combined time-domain return signal to generate a combined digital time-domain signal; and a correlator to correlate the combined digital time-domain signal with the transmitted quadratic polyphase waveform prior to the performance of the Fourier transformation.

45. The radar system of claim 42 further comprising a downconverter to downconvert the combined time-domain signal by mixing with a time-shifted version of a quadratic phase code used to generate the waveform, the downconverter to generate a frequency output for use in identifying the target.

46. The radar system of claim 39 wherein each transmitter element is associated with an antenna element, the antenna elements positioned to substantially cover a detection zone of approximately 360 degrees in azimuth and up to sixty degrees in elevation.

47. The radar system of claim 46 wherein the antenna elements comprise a first set of antenna elements positioned with respect to a first elevation and a second set of antenna elements positioned with respect to a second elevation.

48. The radar system of claim 39 further comprising a target locator to locate the target from frequency-domain outputs provided by the Fourier transformation circuitry, the frequency-domain outputs comprising spectral lines corresponding to a channel, a range gate and a Doppler associated with the target.

49. A method comprising:

simultaneously transmitting frequency separated versions of a quadratic polyphase waveform on a plurality of transmit antennas; and combining a return signal from each antenna into a combined time-domain signal; and performing a Fourier transformation on the combined time-domain signal to locate a target.

50. The method of claim 49 wherein the quadratic polyphase waveform has a series of phase states, wherein transmitting comprises serially transmitting each phase state of the waveform with a time offset therebetween simultaneously on each of the transmit antennas, and wherein the frequency separated versions of each phase state of the waveform simultaneously transmitted on each of the antennas are orthogonal in frequency.

51. The method of claim 50 wherein the waveforms are transmitted on each of the antennas with a frequency spacing therebetween, the frequency spacing being inversely related to a code length of the waveforms.

52. The method of claim 50 further comprising generating the waveform for each transmit antenna with a polyphase modulator from a quadratic phase code.

53. The method of claim 52 wherein the phase states of the waveform are determined from $(\pi n^2)/N$, wherein n is a phase state number and ranges from one to a total number of the phase states, and wherein N is a total number of the phase states and is greater than or equal to sixteen and less than or equal to 128.

54. The method of claim 52 further comprising:

directly sampling a combined time-domain return signal to generate a combined digital time-domain signal; and correlating the combined digital time-domain signal with the transmitted quadratic polyphase waveform prior to performing the Fourier transformation.

55. The method of claim 52 further comprising downconverting the combined time-domain signal by mixing with a time-shifted version of a quadratic phase code used to generate the waveform, the downconverting to generate a frequency output for use in identifying the target.

56. The method of claim 49 wherein each transmitter element is associated with an antenna element, the antenna elements positioned to substantially cover a detection zone of approximately 360 degrees in azimuth and up to sixty degrees in elevation.

57. The method of claim 56 wherein the antenna elements comprise a first set of antenna elements positioned with respect to a first elevation and a second set of antenna elements positioned with respect to a second elevation.

58. The method of claim 49 further comprising locating the target from frequency-domain outputs generated by the Fourier transformation, the frequency-domain outputs comprising spectral lines corresponding to a channel, a range gate and a Doppler associated with the target.

* * * * *